Dec. 8, 1964  H. W. HARTKE, JR  3,160,299
MULTI-DIRECTIONAL VEHICLE BUCKET
Filed Nov. 24, 1961  4 Sheets-Sheet 1

FIG. I

INVENTOR
HERMAN W. HARTKE JR.
BY
Kenneth C. Witt
ATTORNEY

INVENTOR
HERMAN W. HARTKE JR.
BY Kenneth C. Witt
ATTORNEY

Dec. 8, 1964          H. W. HARTKE, JR          3,160,299
              MULTI-DIRECTIONAL VEHICLE BUCKET
Filed Nov. 24, 1961                          4 Sheets-Sheet 3
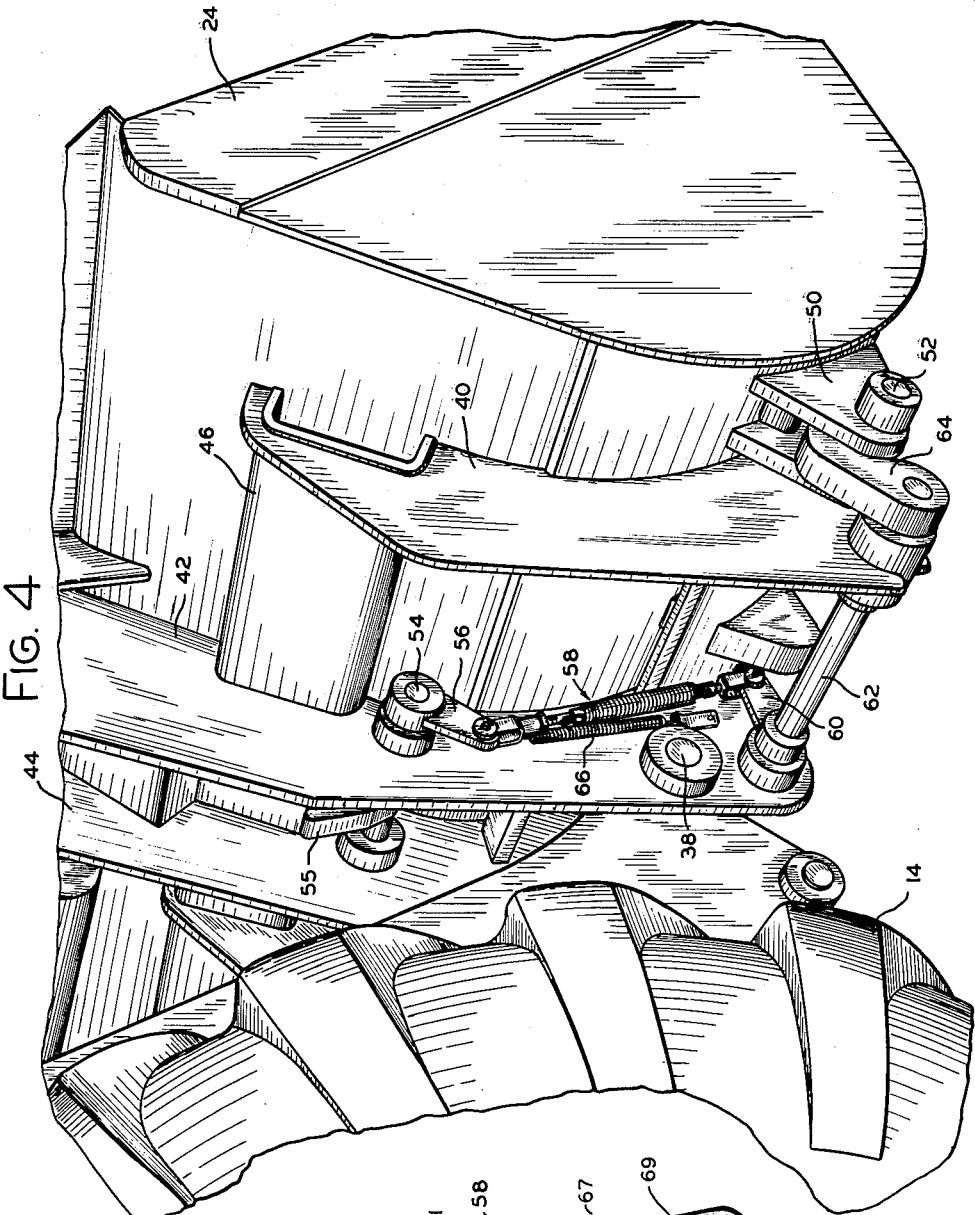
INVENTOR
HERMAN W. HARTKE JR.
BY
Kenneth C. Witt
ATTORNEY Dec. 8, 1964     H. W. HARTKE, JR     3,160,299
MULTI-DIRECTIONAL VEHICLE BUCKET
Filed Nov. 24, 1961                    4 Sheets-Sheet 4
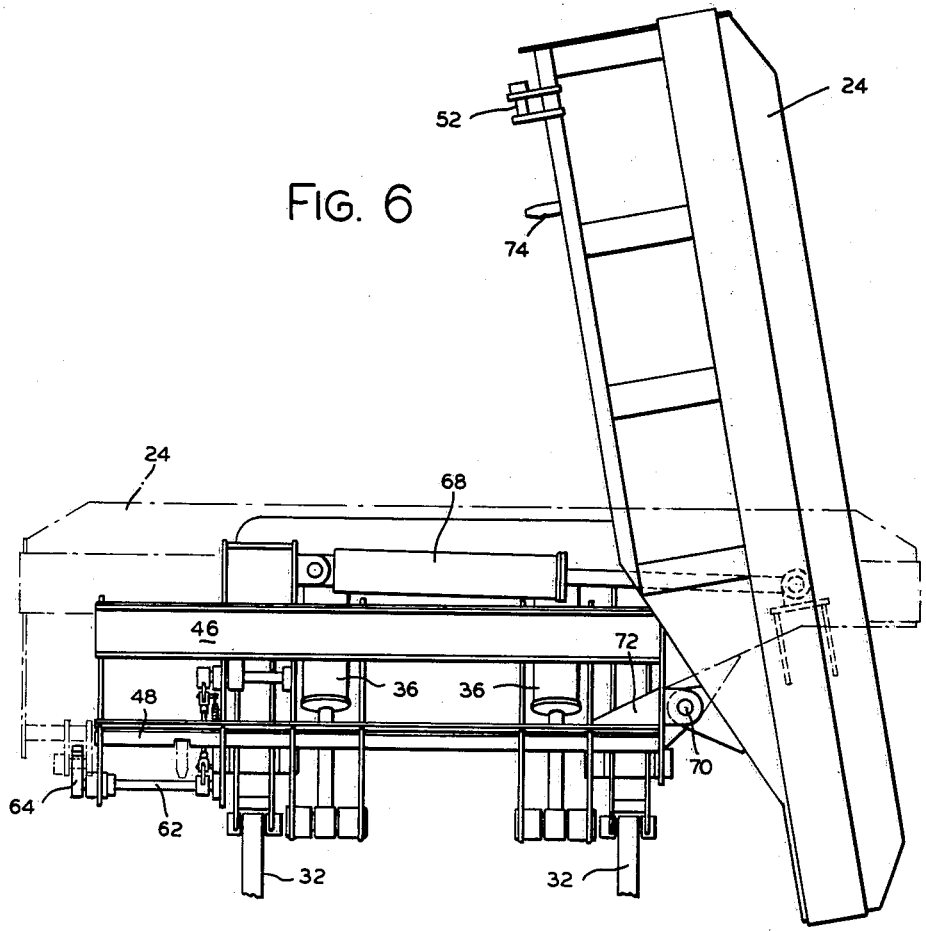
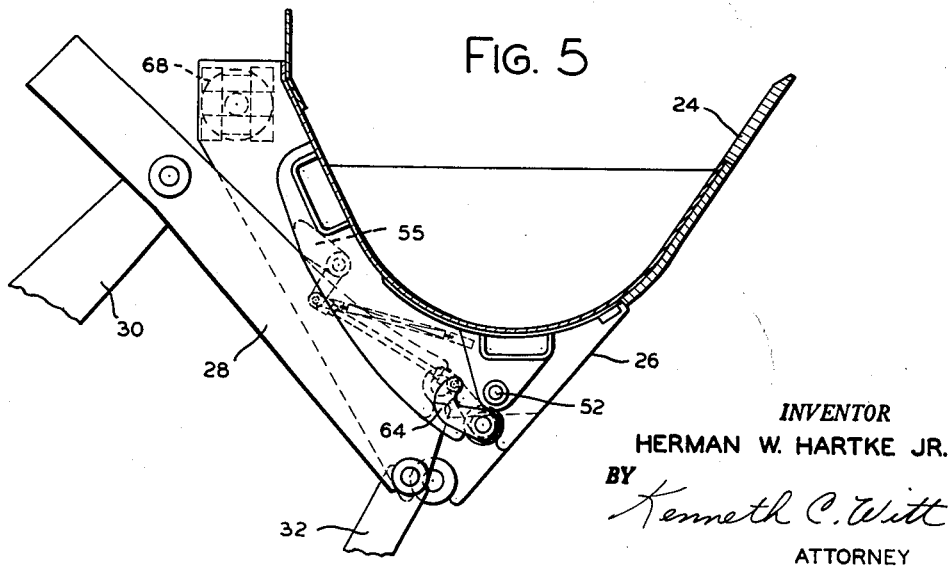
INVENTOR
HERMAN W. HARTKE JR.
BY Kenneth C. Witt
ATTORNEY ns # United States Patent Office 3,160,299
Patented Dec. 8, 1964

3,160,299
MULTI-DIRECTIONAL VEHICLE BUCKET
Herman W. Hartke, Jr., Benton Harbor, Mich., assignor to Clark Equipment Company, a corporation of Michigan
Filed Nov. 24, 1961, Ser. No. 154,491
7 Claims. (Cl. 214—140)

This invention relates to tractor shovels and tractor loaders, and more specifically to vehicle-mounted material handling buckets which are adapted to be dumped in either of two directions.

It is well-known to handle the excavating of earth and the loading of bulk materials by means of tractor vehicles which include material handling buckets as a portion of the vehicle. Commonly such buckets are mounted at the front of the vehicle on boom arms which provide for the lowering and raising of the bucket between digging or loading position and a dumping position. Some of such vehicles are adapted to excavate dirt, sand, rocks and the like below ground level and then raise the material and dump it into a truck, hopper or other receptacle, while such machines can also be used merely as loaders if desired for picking up bulk materials such as crushed stone, coal, grain, fertilizer and the like at or near ground level and loading it into a truck, hopper or other receptacle. Some such machines are less powerful and are adapted only for use as loaders and not as excavators.

It is a convenience when handling material with the bucket on such a vehicle to be able either to dump directly forwardly of the vehicle or to one side of the vehicle. Being able to dump either forwardly or to one side eliminates some of the maneuvering of the vehicle in certain circumstances and facilitates the positioning of the vehicle for dumping the material into the truck or other vehicle or receptacle. The reduction in maneuvering time results in lower operating costs, since more material can be handled in a specified time than is possible with a bucket with is adapted to dump only in one direction.

During excavation or other loading operation to obtain a load of material in the bucket, it is important that the bucket be secured firmly to its cradle or other supporting mechanism to provide support for the bucket and also to prevent inadvertent operation of the bucket in an attempted dumping movement in the other direction. The object of the present invention is to provide an improved mechanism for a multi-directional bucket carried by a vehicle for positively securing the bucket during loading operation but providing for readily dumping the bucket in either of two directions after the dumping position has been reached.

While this invention is described in a preferred embodiment in a vehicle carrying a bucket at the front end thereof on forwardly projecting boom arms, it will be readily understood by those skilled in the art that this invention is applicable also to other types of vehicles such as those with a turntable to carry the material handling bucket, those with a mast structure for carrying the material handling bucket for vertical movement, and others.

In carrying out my invention in one preferred form thereof, I provide a bucket carrier at the forward ends of the boom arms projecting forwardly from the body of a tractor vehicle. A cradle structure is pivotally mounted on the bucket carrier for movement about an axis transverse to the vehicle. A bucket is pivotally mounted on the cradle for pivotal movement about a second axis along the side of the vehicle which is transverse to the first axis. A latching mechanism is provided which normally latches the bucket to the cradle for loading, for pivotal movement between the loading position and the dumping position, and for dumping forwardly. When the cradle is pivoted rearwardly to a predetermined poistion the latching mechanism is operated by contact with the bucket carrier to unlatch it. This permits side dumping movement of the bucket about the second axis.

For a clearer and more complete understanding of my invention, reference should be had to the accompanying drawing in which:

FIGURE 4 is a perspective view of the bucket from the right rear showing more details of the latching mechanism.

FIGURE 4A is an enlarged view of one of the elements of the latching mechanism.

FIGURE 5 is a side view of the bucket in the same position as FIG. 1 but on an enlarged scale, and FIGURE 6 is a partial front view of the vehicle with the bucket in the side dump position.

Figure 1:
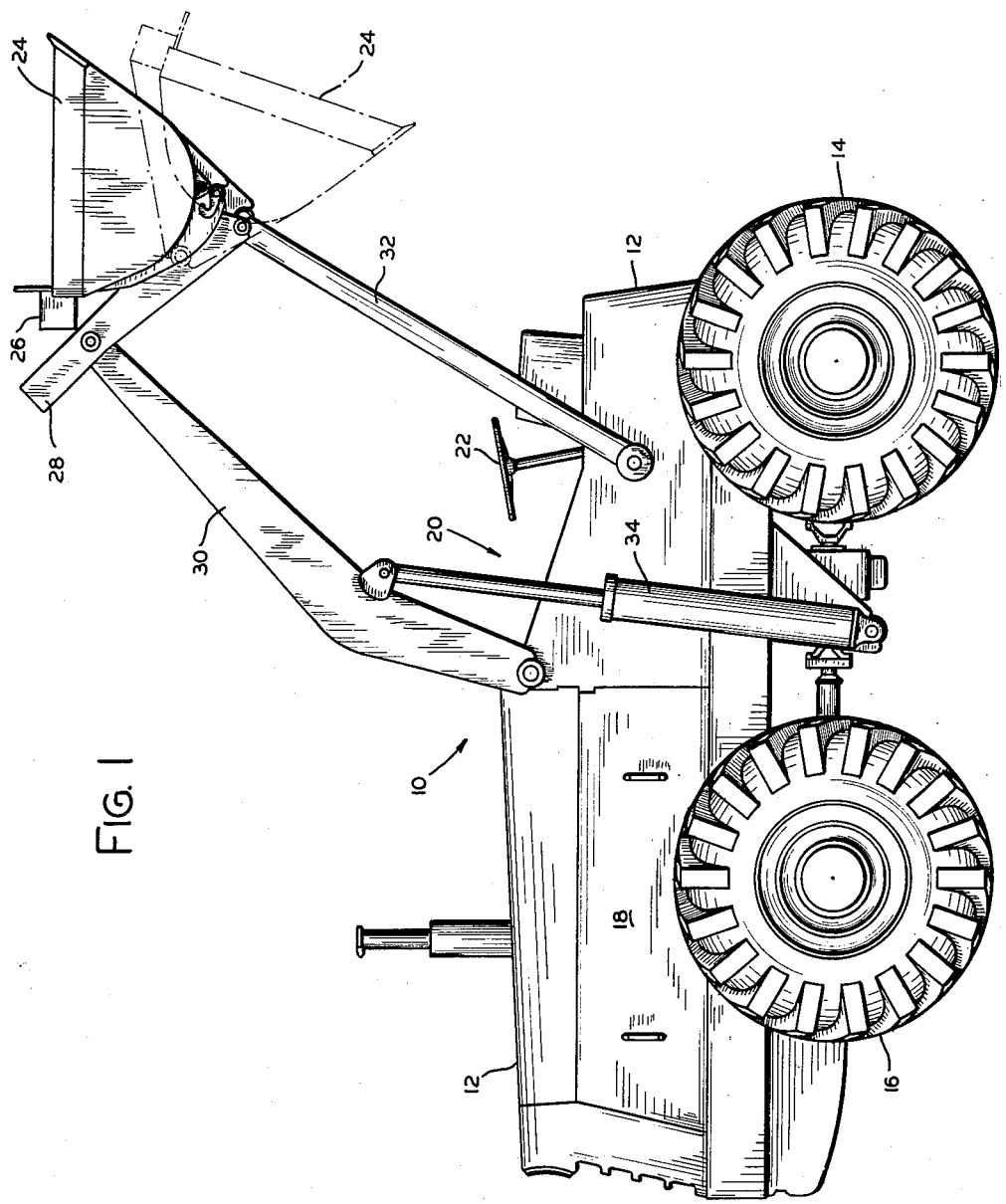
FIGURE 1 is a side elevational view of a tractor vehicle embodying the present invention in a preferred form thereof.

Referring to FIG. 1 of the drawing, the numeral 10 indicates generally a tractor vehicle embodying the present invention. The vehicle 10 includes a body portion 12, a pair of front drive wheels 14, only one of which is visible in this figure, and a pair of rear drive-steer wheels 16 only one of which is visible. The vehicle is propelled by a suitable prime mover (not shown) housed within the enclosure 18, and the vehicle includes an operator's station at location 20 including an operator's steering wheel 22.

The vehicle carries a bucket 24 which is shown in FIG. 1 in an elevated position from which it may be dumped either forwardly to the position illustrated by the dot-dash lines or to the side to the position shown in FIG. 6. The bucket 24 is carried by a cradle 26, and the cradle in turn is pivotally mounted to and carried by a bucket carrier 28. The bucket carrier 28 is carried on the body of the vehicle by means of a pair of main boom arms 30, only one of which is visible in FIG. 1, and a pair of lower stabilizer or guide arms 32 which serve to maintain the bucket 24 approximately level during elevation thereof. Only one of these arms is visible in FIG. 1 but both of them may be seen in FIG. 6. The bucket, the cradle, the bucket carrier and the boom arms are raised and lowered by means of a pair of hydraulic actuators 34, one on each side of the machine, which are pivotally connected between the body and the machine and main boom arms 30. They are extended in a known manner by pressurized hydraulic liquid under the control of the operator of the machine, the pressurized liquid preferably being supplied by a pump operated by the engine of the vehicle, and they may be retracted by gravity.

Figure 2:
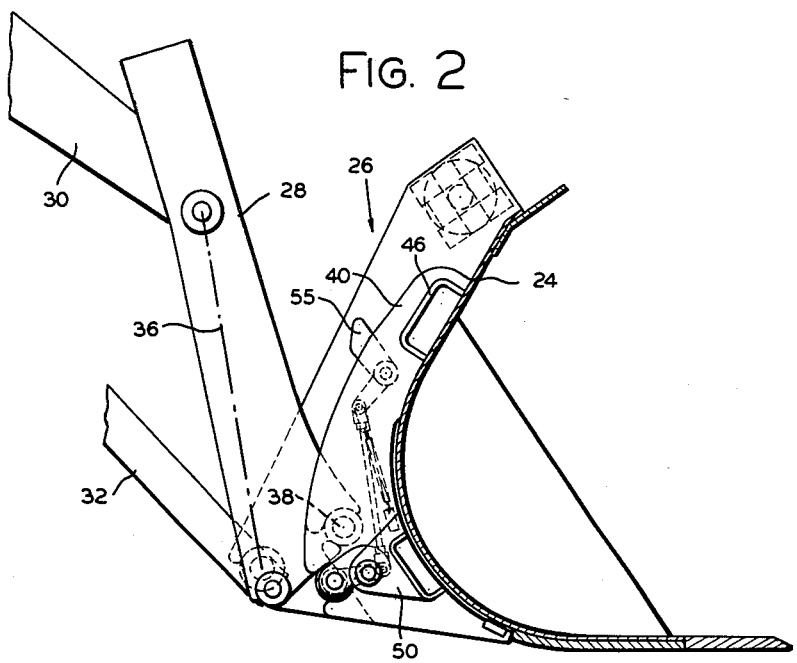
FIGURE 2 is an enlarged side view of the bucket in the loading position.

FIG. 2 of the drawing is a fragmentary view showing the bucket 24 and cradle 26 in position at ground level for loading bulk material into the bucket by driving the vehicle forwardly. It will be appreciated that when the bucket and carrier are pivoted an additional amount clockwise from the position of FIG. 2 that the vehicle and bucket may be utilized for excavating below ground level.

Figure 3:
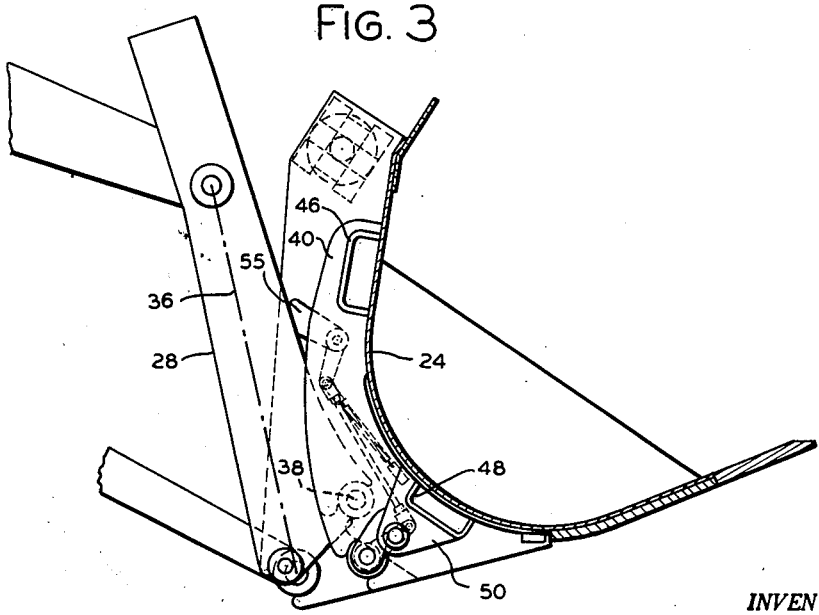
FIGURE 3 is a view similar to FIG. 2 with the bucket in an intermediate position.

FIG. 3 shows the bucket and bucket cradle pivoted rearwardly or counterclockwise from FIG. 2 to the position in which the latch mechanism latching the bucket to the cradle is just about to be unlatched. The bucket 24 and cradle 26 are pivoted between the various positions illustrated in FIGS. 1, 2 and 3 by means of a pair of piston and cylinder type hydraulic actuators 36 which are visible in FIG. 6, and are indicated merely by centerlines in FIGS. 2 and 3 in order to simplify these figures. The cradle 26 is mounted for pivotal movement on the bucket carrier 28 about a transverse axis indicated at 38. See also FIG. 4 which shows this pivot connection in greater detail.

FIG. 4 also shows more details of the skeleton construction of the cradle member 26. The cradle includes a plurality of plate members which are arranged in longitudinal vertical planes and some of these plate members are indicated by the numerals 40, 42 and 44. Connected transversely between such plate members and secured thereto in a suitable manner such as by welding, to form a rigid unitary structure, are a pair of U-shaped channel members 46 and 48 (see FIG. 3). Projecting downwardly and rearwardly from the bucket 24 is a boss structure 50 which carries a pin 52 extending between the two side portions of the boss structure, and pin 52 forms a portion of the latching mechanism as described in greater detail hereinafter.

The latch structure carried by the cradle 26 includes a rock shaft 54 which extends between structural members 42 and 44 of the cradle and carries a lug member 55 and a lever arm 56 secured rigidly thereto on opposite sides of member 42. An adjustable spring link 58, which is described in greater detail hereinafter, is connected between the end of lever arm 56 and another lever arm 60 which is secured rigidly to a rock shaft 62 extending between structural members 40 and 42. A dog 64 is mounted on the end of rock shaft 62 and is arranged to engage pin 52 when the latch is engaged. A tension spring 66 is connected between lever arm 56 and structural member 42 to hold the described latch structure normally in the latching position, and to restore it to such normal condition whenever the unlatching force is removed. Unlatching is accomplished by pivoting the cradle rearwardly until the lug member 55 engages bucket carrier 28, and such engagement occurs at the position indicated in FIG. 3. Further counterclockwise pivoting movement from this position pivots rock shaft 54 which through the interconnecting linkage pivots rock shaft 62 to disengage dog 64 from pin 52 and thereby unlatch the bucket 24 from the cradle 26, as illustrated in FIG. 5.

The adjustable spring link 58 is shown in greater detail in FIG. 4A. This link comprises a rod 59 which is adjustably threaded into an end clevis member 61. The length of link 58 is adjusted prior to assembly by adjusting the amount which the rod 59 is screwed into the member 61. Nut 63 is utilized to secure members 59 and 61 firmly together in the adjusted position. Rod 59 is telescoped into a tube member 65, with the end 67 of rod 59 normally abutting the bottom of the opening in 65 which is formed by another end clevis member 69 which is inserted into tube 65 and secured thereto. A tension spring 71 is connected between a projection 73 on member 59 and another projection 75 on member 65, and the spring is of such strength that it normally holds the end 67 of rod 65 in abutting relation with the cooperating member at the bottom. However, should the latching mechanism malfunction at any time because of the presence of dirt or other foreign matter or because of binding of dog 64, or for any other reason, then the spring 71 allows rod 59 to slide partially out of tube 65. This means that it is possible for lug member 55 to pivot even though dog member 64 does not pivot under such abnormal conditions, and it will be understood that this will prevent breakage of some portion of the latching mechanism under such abnormal conditions. When the abnormal conditions have been corrected the latching mechanism will then operate in the normal manner.

It will be appreciated that the bucket is securely latched to the cradle in the forward loading position as shown in FIG. 2 and remains so latched in all loading and digging positions. The bucket is unlatched only when the cradle and bucket are pivoted rearwardly to the position shown in FIG. 5, when unlatching occurs. The position then assumed by the bucket and cradle may be termed a carrying or lifting position. When it is desired to dump the material in the bucket, the bucket is raised to a position such as that illustrated in FIG. 1 which shows the maximum elevated position, although it is possible to dump the bucket at a lower elevation if desired. The pivoting movement of cradle 26 and bucket 24 with respect to the bucket carrier 28 is accomplished by extending and retracting hydraulic actuators 36 while are under control of the operator at his operator's station and preferably are supplied with hydraulic fluid under pressure from the previously mentioned pump operated by the engine of the vehicle. Retracting the actuators 36 causes the cradle and bucket to pivot clockwise about axis 38 as seen from the side in FIGS. 2 and 3, while extension of such actuators causes the bucket to pivot counterclockwise.

When the mechanism has been elevated to a sufficiently high position the bucket can, if desired, be dumped forwardly merely by retracting the actuators 36; this is a normal operation for a tractor shovel or tractor loader vehicle such as that illustrated herein and the dot-dash lines in FIG. 1 show the forward dumping position. During such operation the latching mechanism will immediately and automatically relatch again as soon as the upper portion of the bucket cradle has pivoted away from the bucket carrier sufficiently to allow the spring 66 to restore the latching mechanism to its latched condition.

However, with the present mechanism, the operator can if he so desires dump the bucket to the side of the vehicle merely by selective actuation of another hydraulic actuator 68 which preferably is supplied from the same hydraulic pump as the other hydraulic actuators on the machine and is controlled by the operator from his station on the vehicle. When this actuator is extended the bucket 24 is pivoted from the position illustrated by the dot-dash lines in FIG. 6 to the solid line position of FIG. 6. Such pivoting occurs about an axis 70 where the bucket 24 is pivotally supported on a boss 72 on the cradle structure. It will be observed that a dowel 74 is provided on the lower surface of bucket 24 which extends through an opening in transverse channel member 48 of the bucket cradle for providing proper alignment of the bucket on the cradle when the bucket is again returned to its initial position by retraction of actuator 68. It will be appreciated that when the bucket 24 is returned to the initial position in this manner in engagement with the cradle and the cradle is thereafter pivoted slightly away from the bucket carrier that the bucket is then solidly supported on the cradle by the pivot connection 70 at one end of the bucket and by pawl-pin portion 64, 52 of the latching mechanism at the other end. Such solid connection is maintained through loading, excavating, forward dumping and any other motion of the bucket and cradle until the cradle is again pivoted adjacent the bucket carrier to unlatch the latching mechanism.

While I have described and illustrated herein a preferred embodiment of the invention, it will be understood by those familiar with mechanisms of this type that modifications may be made. I intend to cover by the appended claims all such modifications falling within the true spirit and scope of this invention.

Where reference is made in the claims to a bucket carrier it should be understood that the claim is not limited to a bucket carrier mounted at the ends of forwardly extending boom arms as illustrated herein. Such bucket carrier may be, for example, the carriage which moves up and down on the mast of a mast type material handling vehicle, or it may be some other portion of a vehicle such as a part of the turnable on a turnable type material handling vehicle.

I claim:

1. A bucket mechanism for a vehicle comprising a bucket carrier carried by the vehicle for raising and lowering movement, a cradle structure pivotally mounted on the said bucket carrier for pivotal movement about an axis transverse to the vehicle, a bucket pivotally mounted on the said cradle for pivotal movement about a second axis transverse to the said first axis, means latching the said bucket to the said cradle, and mechanism responsive to the pivotal movement of the said cradle for unlatching the said bucket from the said cradle when the cradle is pivoted to a predetermined position.

2. In a vehicle, a cradle structure pivotally mounted on the vehicle for pivotal movement about an axis transverse to the vehicle, a bucket pivotally mounted on the said cradle for pivotal movement about a second axis transverse to the said first axis, means latching the said bucket to the said cradle, and means responsive to the pivotal movement of the said cradle for unlatching the said bucket from the said cradle when the cradle is pivoted to a predetermined position.

3. A material handling vehicle having a body portion, forwardly projecting boom arm means pivotally mounted on the said body portion and arranged for the forward ends of the boom arm means to be raised and lowered, a bucket carrier carried by the said forward ends of the boom arm means, a cradle structure pivotally mounted on the said bucket carried for pivotal movement about an axis transverse to the vehicle between one position in which a portion of the said cradle structure projects outwardly from the said bucket carrier and second position in which the said portion of the cradle structure is closely adjacent the bucket carrier, an elongated bucket extending transversely of the said cradle and pivotally mounted on the cradle for pivotal movement about a second axis adjacent one side of the said vehicle body and transverse to the said first axis, means latching the said bucket to the said cradle, and means which unlatches the said bucket from the said cradle when the cradle is in the said second position.

4. A material handling vehicle having a body portion, a plurality of forwardly projecting boom arms having their rearward ends pivotally mounted on the said body portion and their forward ends extending forwardly of the said body portion, power means connected between the said body portion and the said boom arms for pivoting the boom arms and raising the lowering the forward ends thereof, a bucket carrier pivotally secured to and carried by the said forward ends of the said boom arms, a cradle structure pivotally mounted on the said bucket carrier for pivotal movement about an axis transverse to the vehicle between one loading position in which a portion of the said cradle structure projects outwardly away from the said bucket carrier and a second carrying position in which the said portion of the cradle structure is closely adjacent the bucket carrier, second power means connected between the said bucket carrier and the said cradle structure for selectively pivoting the cradle structure between the said first and second positions and a third forward dumping position, an elongated bucket extending transversely of the said cradle structure and pivotally mounted on the said cradle structure for pivotal movement about a second axis adjacent one side of the said vehicle body and transverse to the said first axis, third power means for selectively pivoting the said bucket between a position in which it reposes on the said cradle structure and another side dumping position, means for latching the other end of the said bucket to the said cradle structure except in the said second position of the cradle structure, and means responsive to the movement of the said cradle structure closely adjacent the said bucket carrier and including a dog member carried by the said cradle structure for unlatching the said bucket from the cradle structure when the cradle structure is in the said second position.

5. A multi-directional bucket mounting and dumping mechanism for a material handling vehicle comprising, an elongated bucket located transversely of the vehicle adjacent one end thereof, a bucket supporting cradle, means pivotally connecting the said bucket to the said cradle adjacent one end of the bucket, means for pivoting the said bucket between a first position on the said cradle and a second side dumping position, additional means for pivoting both the said bucket and the said cradle from the said first position forwardly to a third position, and mechanism responsive to the movement of the bucket and cradle from the said first position toward the said third position for latching the said bucket to the said cradle.

6. In a material handling vehicle, an elongated bucket located transversely of the vehicle adjacent one end thereof, a bucket supporting cradle, means pivotally connecting the said bucket to the said cradle adjacent one end of the bucket for pivotal movement between a first position in which the said bucket is in repose on the said cradle and a second side dumping position in which the said bucket is in a second generally vertically disposed side dumping position, power means for pivoting the said bucket between the said first and second positions, additional power means for pivoting both the said bucket and the said cradle simultaneously from the said first position forwardly to a third position for forward dumping, a latch pin carried by the said bucket adjacent the other end thereof, and a latching mechanism carried by the said cradle and arranged to be operated by the first portion of the movement of the said cradle from the said first position toward the said third position for automatically latching the bucket to the cradle.

7. In a vehicle, a cradle structure pivotally mounted on the vehicle for pivotal movement about an axis transverse to the vehicle, a bucket pivotally mounted on the said cradle for pivotal movement about a second axis transverse to the said first axis, a mechanism responsive to pivotal movement of the said cradle relative to the vehicle which unlatches the said bucket from the said cradle when the said cradle is pivoted to a predetermined position and latches the said bucket to the said cradle when the said cradle is pivoted away from the said predetermined position.

References Cited in the file of this patent

UNITED STATES PATENTS

| | | |
|---|---|---|
| 2,704,163 | Christiansen | Mar. 15, 1955 |
| 2,811,265 | Wagner | Oct. 29, 1957 |
| 2,821,313 | Warner | Jan. 28, 1958 |